United States Patent
Kaneda

(10) Patent No.: US 7,531,927 B2
(45) Date of Patent: May 12, 2009

(54) VEHICLE-USE AC GENERATOR HAVING REAR COVER FORMED TO PREVENT INTRUSION OF FOREIGN MATTER INTO VICINITY OF SLIP RINGS

(75) Inventor: Reikichi Kaneda, Okazaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/704,345

(22) Filed: Feb. 9, 2007

(65) Prior Publication Data
US 2007/0188042 A1    Aug. 16, 2007

(30) Foreign Application Priority Data
Feb. 15, 2006    (JP)    ............... 2006-037636

(51) Int. Cl.
*H02K 5/00*    (2006.01)
*H01R 39/38*    (2006.01)

(52) U.S. Cl. ......................... 310/89; 310/239

(58) Field of Classification Search .................. 310/45, 310/68, 88, 89, 232, 239, 242, 263
See application file for complete search history.

(56) References Cited

U.S. PATENT DOCUMENTS

| | | | |
|---|---|---|---|
| 4,959,576 A * | 9/1990 | Horibe et al. | 310/239 |
| 5,424,600 A * | 6/1995 | Ishikawa et al. | 310/220 |
| 6,707,226 B2 * | 3/2004 | Umeda | 310/263 |
| 6,710,499 B2 * | 3/2004 | Tsuge | 310/232 |
| 2002/0113505 A1 * | 8/2002 | Takahashi et al. | 310/71 |
| 2003/0034703 A1 * | 2/2003 | Oohashi et al. | 310/68 B |
| 2004/0239195 A1 * | 12/2004 | Okamura et al. | 310/68 D |
| 2005/0006978 A1 * | 1/2005 | Bradfield | 310/263 |
| 2005/0280330 A1 * | 12/2005 | Mashino | 310/239 |
| 2006/0113861 A1 * | 6/2006 | Mukai et al. | 310/263 |

FOREIGN PATENT DOCUMENTS

JP    B2 7-32571    4/1995

* cited by examiner

*Primary Examiner*—Quyen P Leung
*Assistant Examiner*—John K Kim
(74) *Attorney, Agent, or Firm*—Oliff & Berridge, PLC

(57) ABSTRACT

The rear cover of a vehicle-use AC generator is integrally formed with a portion that is shaped to enclose at least a part of a circumferentially extending region around the slip rings of the generator. Hence the rear cover, alone or in combination with an appropriately shaped brush holder, serves to seal the region of contact between the slip rings and brushes against intrusion of foreign matter, without the use of sealing members for preventing such intrusion.

2 Claims, 4 Drawing Sheets

VEHICLE-USE AC GENERATOR HAVING REAR COVER FORMED TO PREVENT INTRUSION OF FOREIGN MATTER INTO VICINITY OF SLIP RINGS

CROSS-REFERENCE TO RELATED APPLICATIONS

This application is based on and incorporates herein by reference Japanese Patent Application No. 2006-037636 filed on Feb. 15, 2006.

BACKGROUND OF THE INVENTION

Field of Application

The present invention relates to a vehicle-use AC generator, for installation in a truck, automobile, etc.

A problem which arises with a vehicle-use AC generator is that foreign matter such as water, sand, etc., may enter into contact with sliding components such as the slip rings and brushes of the generator. This results in occurrence of abnormally high friction, and so measures must be taken to prevent such intrusion of foreign matter. For example, with one prior art configuration for prevention of such foreign matter into a vehicle-use AC generator, a tubular-configuration slip ring cover is combined with the brush holder, and a sealing members is disposed at an end (i.e., with respect to the axial direction of the rotor) of the slip ring cover. This is described in Japanese patent publication No. 7-32571 (pages 3 to 5 and FIGS. 1 to 13). In that way, by surrounding the circumferences of the slip rings with the brush holder, the slip ring cover and the sealing member, the sliding faces of the slip rings and brushes can be effectively sealed against intrusion of foreign matter from the exterior.

However with such a configuration it is necessary to provide other components in addition to the brush holder, i.e., the slip ring cover and the sealing member. Hence the number of components constituting the alternator becomes increased, and the cost is accordingly increased, while manufacturing is made more complex.

Furthermore, due to the need to insert the sealing member between the brush holder and the slip ring cover and rear cover, the overall axial length of the alternator will be correspondingly increased, so that the overall size of the AC generator will be increased.

SUMMARY OF THE INVENTION

It is an objective of the present invention to overcome the, above problems, by providing a vehicle-use AC generator whereby the intrusion of foreign matter into the vicinity of the slip rings and brushes of the generator can be effectively prevented, while also enabling the AC generator to be manufactured at low cost by a simple manufacturing process, and also while enabling the AC generator to be made of compact size.

The invention is applicable to a vehicle-use AC generator having a rotor, slip rings mounted circumferentially on the rotor shaft, a stator disposed circumferentially surrounding the rotor, a frame which fixedly retains the stator and rotatably supports the rotor, a brush apparatus comprising a plurality of brushes and a brush holder for retaining the brushes and maintaining the brushes in sliding contact with respectively corresponding ones of the slip rings, and a rear cover disposed to enclose a rear end portion of the generator. To achieve the above objectives, a vehicle-use AC generator according to the present invention has the rear cover integrally formed with a circumferential wall section, which encloses a circumferentially extending region around the slip rings.

As a result of this configuration of the rear cover of the generator, the intrusion of foreign matter into the internal region around the slip rings can be prevented, without the necessity to provide a sealing member between the brush holder and the rear cover. Thus the total number of component parts of the generator can be reduced, and the cost can thereby be lowered, while the manufacturing process can be simplified. In addition, it is unnecessary to increase the axial length of the generator, as is required if a sealing member is disposed between the brush holder and the rear cover, so that the invention enables the overall size of the generator to be made compact.

Preferably, the brush holder comprises a circumferential enclosure section that is disposed diametrically opposite the circumferential wall section of the rear cover, so that this circumferential enclosure section in combination with the circumferential wall section serves to completely surround the slip rings. By joining the brush holder and the circumferential enclosure section of the rear cover, without a gap being formed between them, the intrusion of foreign matter into the space around the slip rings can be effectively prevented.

In that case, the brush holder and the circumferential wall section of the rear cover are preferably formed such that they can be readily attached together in a simple manner, to thereby form a single unit.

This may be achieved by forming the brush holder with a first set of lateral engagement portions (i.e., each extending parallel to the rotor axis, when the generator is in the assembled condition) and forming the circumferential wall section of the rear cover with a second set of lateral engagement portions that are shaped such as to engage with respectively corresponding ones of the first set of lateral engagement portions along directions that are parallel to the rotor axis. In that way, internal faces of the circumferential wall section of the rear cover and of a lower part of the brush holder, in combination, form a continuously extending face that surrounds the circumferences of the slip rings, thereby effectively excluding the entry of foreign matter.

From another aspect, the rear cover is preferably integrally formed with a laterally protruding section that extends parallel to the rotor axis, positioned to overlap an inner circumferential face of the brush holder, while being in direct contact with the inner circumferential face. In that way it can be ensured that there will be no gap between the rear end of the brush holder and the rear cover.

Alternatively, the circumferential wall section of the rear cover may be formed with a tubular configuration, and disposed to circumferentially surround the entirety of the brush apparatus and the slip rings. In that way, the intrusion of foreign matter into the space around the slip rings can be effectively prevented, while each of the brush holder and the rear cover can have a simple configuration that is readily manufactured.

From another aspect, the frame is preferably integrally formed with a laterally protruding section, extending from an outer rear face of the frame parallel to the rotor axis, with the laterally protruding section being positioned to overlap an outer circumferential face of the circumferential wall section of the rear cover. In that case, the dimensions of the circumferential wall section can be made such that there is a predetermined size of gap along the axial direction between a tip portion of the circumferential wall section and the outer end face of the frame, and such that there is a predetermined size of gap, along a radial direction, between a portion of the outer face of the circumferential wall section and the laterally protruding section of the frame.

In that way, an aperture having a labyrinth configuration, i.e., through which air must travel along a zig-zag path, is provided as an intake aperture for cooling air that passes between a front end of the rear cover and a rear face of the frame and hence to the circumferences of the slip rings. Due to the air flow path having such a labyrinth configuration, entry of foreign matter through the intake aperture along with the air flow can be prevented.

Alternatively, where such an air intake aperture for the slip rings is unnecessary, the rear cover is preferably formed such that a tip portion of the circumferential wall section of the rear cover is disposed in contact with an outer rear face of the frame, and such that when the rear cover is attached to the frame (e.g., by screw-tightening the nuts of respective attachment bolts of the rear cover, thereby urging the rear cover against the outer rear face of the frame), elastic deformation of the rear cover occurs. Effective sealing can thereby be achieved, to prevent intrusion of foreign matter into the space around the slip rings.

As a further alternative for providing such effective sealing when an air intake aperture for the slip rings is unnecessary, the rear cover can be formed such that a tip portion of the circumferential wall section is located with a predetermined amount of gap from an outer end face of the frame, with a sealing member being disposed within the gap.

DESCRIPTION OF PREFERRED EMBODIMENTS

Figure 1:
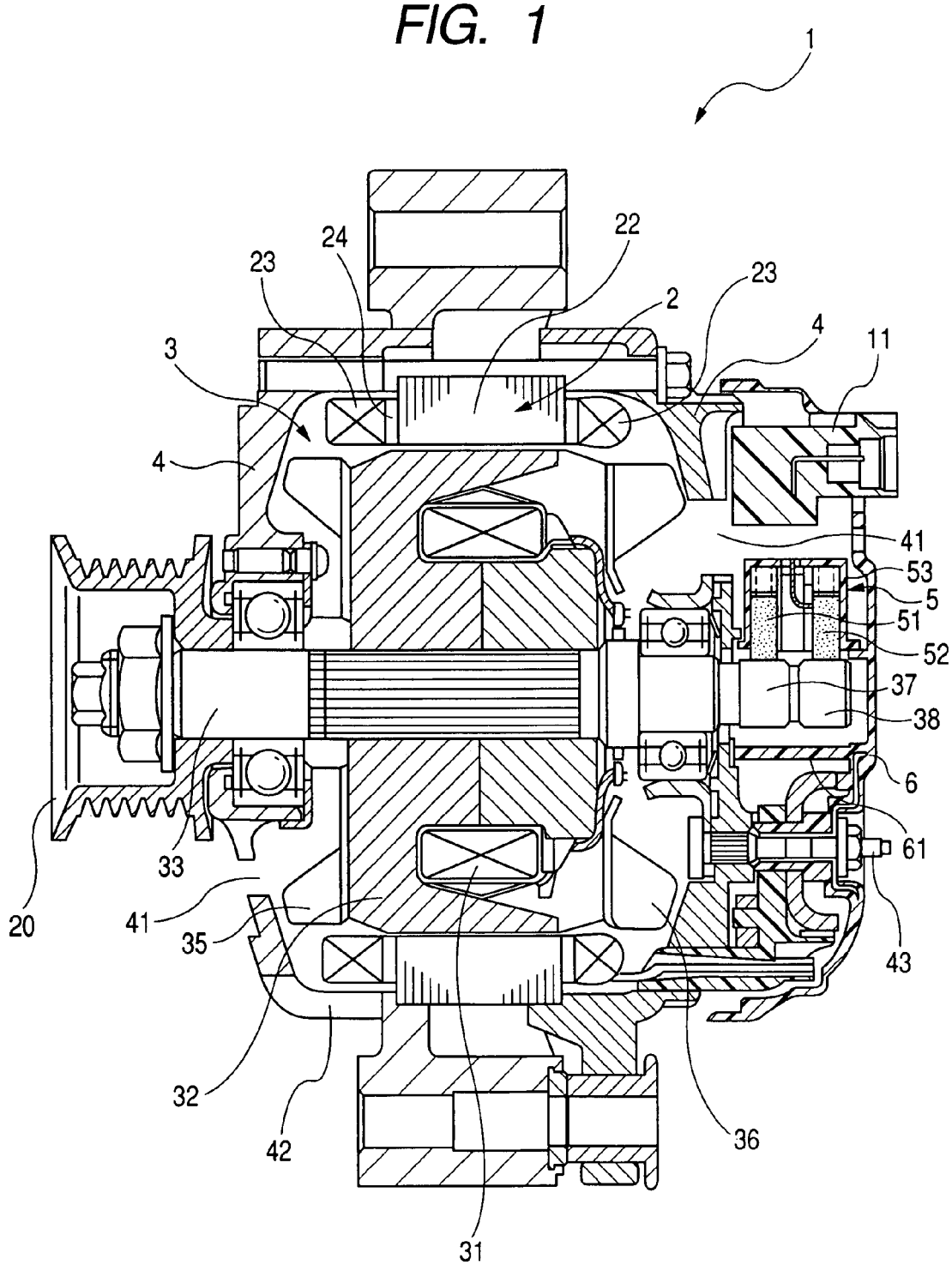
FIG. 1 is a cross-sectional view showing the overall configuration of an embodiment of a vehicle-use AC generator.

FIG. 1 shows the overall configuration of an embodiment of a vehicle-use AC generator, designated by numeral 1. As shown, the AC generator 1 includes a stator 2, rotor 3, a frame 4, a brush apparatus 5 and a rear cover 6.

The AC generator 1 has a rotor shaft 33 with a pulley 20 fixedly mounted at one end thereof, with the pulley 20 being driven for rotation by a belt or chain (not shown in the drawings) from a vehicle engine (not shown in the drawings). In the following description and in the appended claims, the term "front" as applied to position relationships of a component of the AC generator 1 is used in referring to a part of the component that is located axially closest to the front end of the rotor shaft 33 (i.e., the end on which is mounted the pulley 20), when the AC generator is in an assembled condition. Similarly, the term "rear" is used in referring to a location that is axially opposite to a "front" part of a component. The term "axially" or "axial direction" is used in referring to directions parallel to the axis of the rotor shaft 33. The terms "circumferential" or "circumferentially" are used with respect to the axis of the rotor shaft 33 as a center.

The stator 2 is made up of a stator iron core 22, a 3-phase stator winding 23, and an insulator 24 disposed for electrical insulation between the stator iron core 22 and the stator winding 23. The rotor 3 has a field winding 31 formed of insulated copper wire that is of circular cross-section, wave-wound concentrically. The rotor shaft 33 passes through the field winding 31, which is retained at its axially opposing ends between a set of six tooth portions of a pole core 32, which is fixedly mounted on the rotor shaft 33. A cooling fan 35 is welded to the outer face of the front end of the pole core 32, for directing a flow of cooling air radially and axially into the AC generator 1, with the air being drawn in through the front end of the AC generator 1. A cooling fan 36 is similarly welded to an outer face of the rear end of the pole core 32, for directing a flow of cooling air radially into the AC generator 1, with the air being drawn in through the rear end of the AC generator 1. Two slip rings 37, 38 are fixedly mounted on the rear end of the rotor shaft 33, coaxial with the axis of the rotor shaft 33, with the slip rings 37 and 38 being respectively electrically connected to opposing ends of the field winding 31. Electric current is supplied via the slip rings 37 and 38 and a brush apparatus 5 to the field winding 31.

The frame 4 accommodates the stator 2 and the rotor 3, with the rotor 3 being rotatably supported in the frame 4 by means of the rotor shaft 33 and with the stator 2 being fixedly attached to the frame 4 with a predetermined spacing from the outer circumference of the pole core 32.

The frame 4 is provided with an air ventilation outlet aperture 42 that is disposed opposite a part of the stator winding 23 that protrudes in the axial direction from the front end face of the stator iron core 22. The frame 4 is also provided with an air ventilation intake aperture 41, disposed opposite a part of the stator winding 23 that protrudes in the axial direction from the rear end face of the stator iron core 22.

The brush apparatus 5 contains two brushes 51, 52 disposed in sliding contact with the slip rings 37 and 38, with the brushes 51 and 52 being accommodated within a brush holder 53 of the brush apparatus 5.

A rear cover 6 is fixedly attached to an outer part of the rear end of the frame 4, and covers the brush apparatus 5, as well as a rectifier apparatus and a regulator IC (integrated circuit). The rear cover 6 is formed of plastic and is provided with a plurality of air ventilation apertures. The rear cover 6 is also formed with three attachment holes, through which are passed three bolts 43 that are fixedly attached to the frame 4 and extend rearward along the axial direction, with the rear cover 6 being attached to the frame 4 by screwing a nut down on each corresponding bolt 43, as shown in FIG. 1.

The rear cover 6 is also formed with a circumferential wall section 61, disposed circumferentially around the slip rings 37 and 38. Details of the configuration of the brush apparatus 5 and of portions of the frame 4 and the circumferential wall section 61 located adjacent to the brush apparatus 5 are provided hereinafter.

While the rotor 3 of the AC generator 1 is being driven for rotation (belt or chain-driven at the pulley 20 from the vehicle engine as described above), an excitation voltage is externally supplied to the field winding 31 of the rotor 3 so that portions of the pole core 32 become magnetized and a 3-phase AC voltage is thereby generated by the stator winding 23. This is rectified to obtain an output DC current, that is supplied from an output terminal 11 of the generator.

Figure 2:
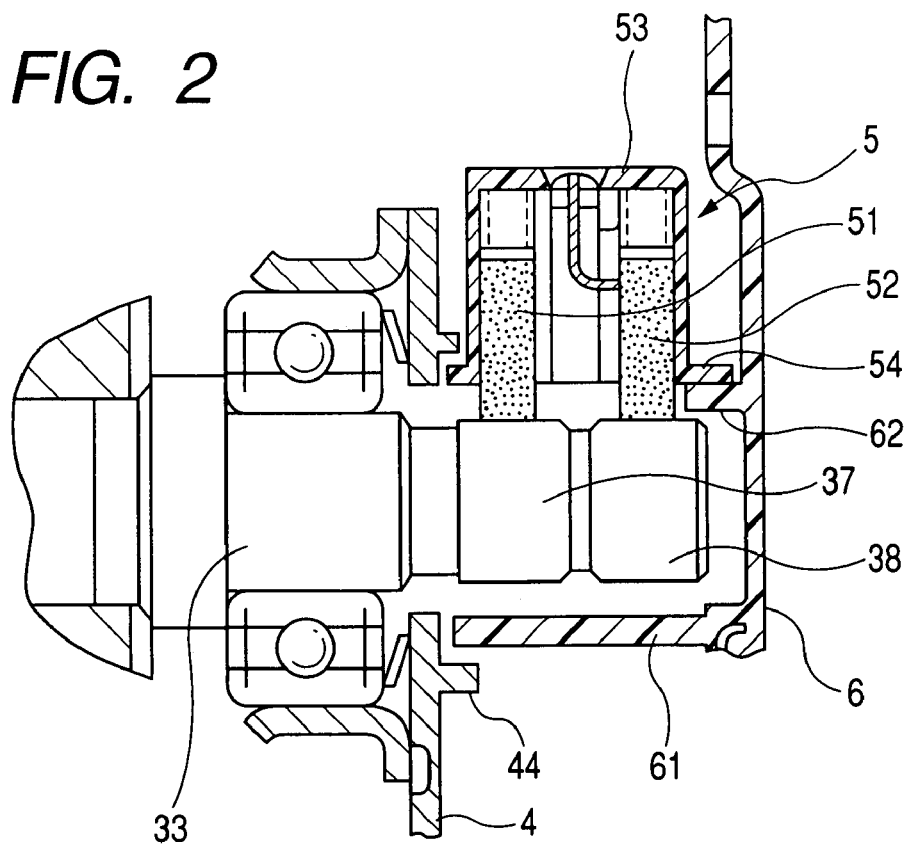
FIG. 2 is an expanded partial cross-sectional view showing components in the vicinity of a brush apparatus of the embodiment.
Figure 3:
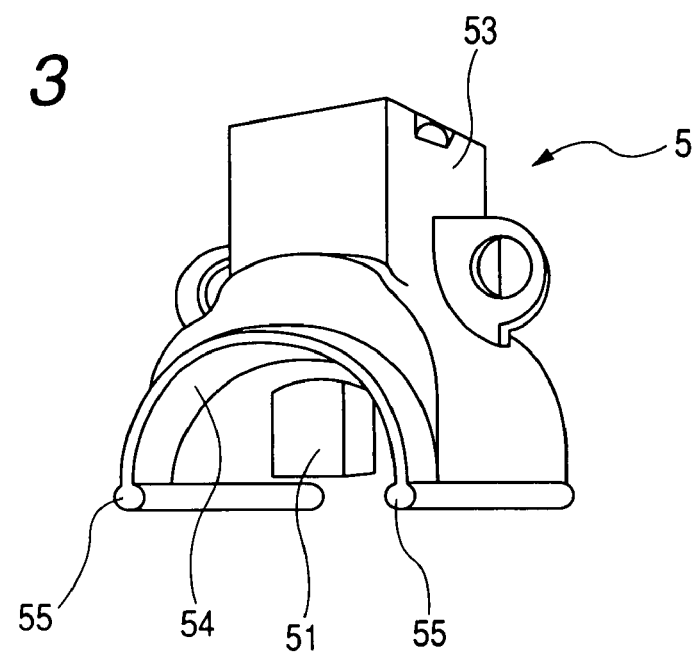
FIG. 3 is an oblique external view of the brush apparatus.
Figure 4:
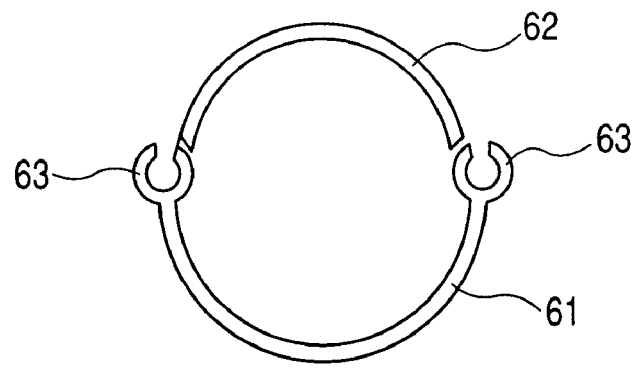
FIG. 4 is a diagram showing the circumferential configurations of axially extending portions which are formed protruding from a front face of a rear cover of the embodiment.

FIG. 2 is an expanded partial cross-sectional view of the vicinity of the brush apparatus 5, while FIG. 3 is an oblique external view of the brush apparatus 5. FIG. 4 is a diagram showing the circumferential wall section 61 and a laterally protruding portion of the rear cover 6, as viewed along the axial direction. As shown, each of these has an inner face having an arc-shaped contour (as seen along the axial direction), with these arcs substantially forming a circle that is coaxial with the rotor axis.

As shown in FIGS. 2 and 3, the brush holder 53 of the brush apparatus 5 is formed with an upper box-shaped portion for accommodating the brushes 51 and 52, with that box-shaped portion extending downward into a lower portion (through which the brushes 51 and 52 protrude downward) that is formed with a curved lower face 54. That curved face 54 is in the form of a part of a tubular face, i.e., curved as an arc of a circle that is coaxial with the axis of the rotor shaft 33, as seen along the axial direction, and is disposed immediately opposite the circumferences of the slip rings 37, 38.

Also as shown in FIG. 3, the two outermost (with respect to the circumferential direction) ends of the lower part of the brush holder 53 are formed with respective axially extending cylindrical portions 55, referred to in the following as lateral engagement portions, each extending from the curved face 54. When the AC generator 1 is assembled, these lateral engagement portions 55 become engaged along the axial direction within two corresponding lateral engagement portions of the circumferential wall section 61 of the rear cover 6, which are of hollow tubular configuration as shown in FIG. 4 (each formed with a laterally extending upper slot) and are formed on two outermost (with respect to the circumferential direction) ends of the circumferential wall section 61. As a result of this coupling of the respective pairs of lateral engagement portions of the circumferential wall section 61 and the brush holder 53, these become attached together to form a single unit.

Also as shown in FIGS. 2 and 4, the laterally protruding section 62 of the rear cover 6 extends axially from the front (inner) face of the rear cover 6, adjacent to the brush apparatus 5. As described above, the laterally protruding section 62 is formed with an inner face formed as an arc (as seen along the axial direction), and it is also formed with an outer circumferential face that is similarly formed as an arc that is concentric with the axis of the rotor shaft 33. As can be understood from FIGS. 2 and 4, that outer circumferential face of the laterally protruding section 62 is disposed to contact the curved face 54 of the brush apparatus 5, within a region of contact that extends in the circumferential direction and also along the axial direction, when the AC generator 1 is in the assembled condition.

In addition, the axial length of the circumferential wall section 61 is predetermined such that, when assembled on the AC generator 1, there is a specific size of gap between the front tip of the circumferential wall section 61 (i.e., the leftmost end face of the circumferential wall section 61, as seen in FIG. 2) and the rear outer face of the frame 4 (i.e., the end face of the frame 4 that is disposed adjacent to the brush holder 53). In addition, that rear outer face of the frame 4 has a laterally protruding section 44 formed thereon, protruding rearward in the axial direction, having an arc-shaped inner face (as seen along the axial direction) that corresponds in shape and circumferential length to the outer circumferential face of a front end (tip) portion of the circumferential wall section 61. The laterally protruding section 44 overlaps a part of that front end portion of the circumferential wall section 61 along the axial direction and is spaced apart from the circumferential outer face of that portion of circumferential wall section 61 by a predetermined distance (i.e., in the radial direction).

In that way, the circumferential wall section 61 and the laterally protruding section 44 overlap one another such that a ventilation aperture having a labyrinth configuration is formed between the circumferential wall section 61 and the laterally protruding section 44, with that labyrinth configuration serving to obstruct the entry of foreign matter through the aperture.

As described above, the respective pairs of lateral engagement portions 55 of the brush holder 53 and lateral engagement portions 63 of the circumferential wall section 61 of the rear cover 6 are engaged with one another at the time of assembling the rear cover 6 on the AC generator 1, i.e., by inserting the lateral engagement portions 55 through corresponding ones of the lateral engagement portions 63, along the axial direction. The brush holder 53 and circumferential wall section 61 thereby become fixedly attached to form a single unit.

In the above-described region of overlap between the laterally protruding section 62 of the rear cover 6 and the curved face 54 of the brush holder 53, there is substantially no gap between the inner circumferential face of the curved face 54 and the outer circumferential face of the laterally protruding section 62. However as shown in FIG. 2, the relationship between the dimensions of the curved face 54 of the brush holder 53 and the laterally protruding section 62 of the rear cover 6 are such that a small gap exists, along the axial direction, between the rear axial end of the curved face 54 and the adjacent rear inner face (i.e., extending at right angles to the axial direction) of the circumferential wall section 61. As a result, even if the position of the brush apparatus 5 should be displaced along the axial direction by a small amount in relation to a specified axial position for the brush apparatus 5, this will have no effect upon the condition of mutual engagement (mutual overlapping contact) between the curved face 54 and the laterally protruding section 62. That is to say, the configuration provides a specific amount of tolerance for small amounts of lateral displacement of the brush holder 53, i.e., along the axial direction, while maintaining contact between a part of the curved face 54 of the brush holder 53 and the outer circumferential face of the laterally protruding section 62 of the rear frame 6.

In that way with this embodiment the circumferential wall section 61 which is an integral part of the rear cover 6, in combination with only the brush cover 53, serves to completely surround the circumferences of the slip rings 37 and 38, to thereby prevent the entry of foreign matter into the space around the slip rings. Thus with this embodiment it becomes unnecessary to provide a slip ring cover that is combined with the brush holder 53, or to provide a sealing member between the brush holder 53 and the rear cover 6. Hence the total number of components of the AC generator 1 is minimized, so that costs can be reduced and the manufacturing process can be simplified.

In addition, since it becomes unnecessary to provide a sealing member that is disposed between the brush holder 53 and the rear cover 6, the total length of the AC generator (along the axial direction) can be reduced, so that the generator can be made of compact size.

Moreover, due to the fact that the brush holder 53 and the circumferential wall section 61 are attached to one another by means of the mutual coupling of the two pairs of lateral engagement portions 55 and 63 along the axial direction, the attachment between the brush holder 53 and the circumferential wall section 61 is achieved while circumferentially enclosing the slip rings 37 and 38 between the circumferential wall section 61 and the curved face 54 of the brush holder 53, without any gap being formed between these. This further serves to reliably prevent foreign matter from entering the space between the circumferences of the slip rings 37 and 38 and the brush holder 53 and circumferential wall section 61.

Furthermore due to the fact that the rear cover 6 is integrally formed with the laterally protruding section 62, which contacts the inner circumferential face of the curved face 54 of the brush holder 53 in a region of overlap that extends axially and circumferentially, no gap is formed between the rear end of the brush holder 53 and the rear cover 6.

In addition as described above, the frame 4 is formed with a laterally protruding section 44 that overlaps the outer circumference of the circumferential wall section 61 along the axial direction, with a specific amount of gap being formed between the laterally protruding section 44 and the circumferential wall section 61, while in addition the front end of the circumferential wall section 61 is spaced apart from the frame 4, so that a gap in the form of a labyrinth aperture exists between the frame 4 and the circumferential wall section 61. This serves as an intake aperture for a flow of cooling air into the region around the circumferences of the slip rings 37 and 38, while obstructing the entry of foreign matter into that region.

It should be noted that the invention is not limited to the above embodiment, and that various modifications or alternative configurations could be envisaged.

Figure 5:
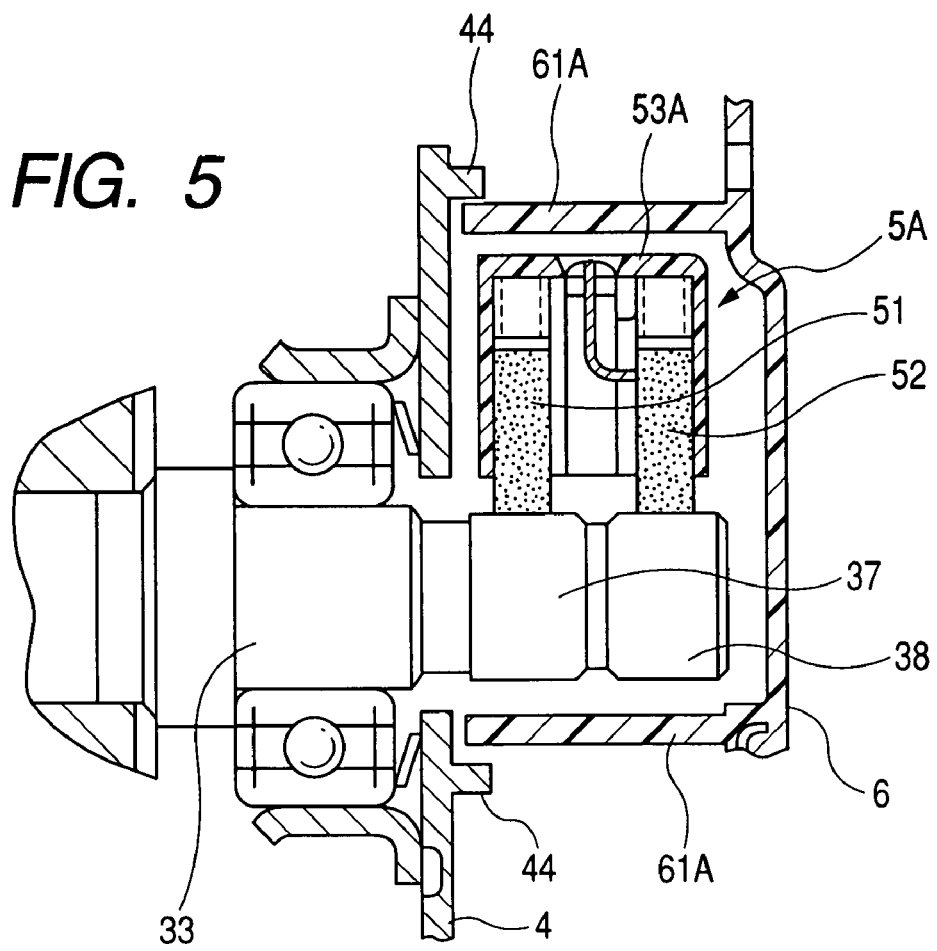
FIG. 5 is an expanded partial cross-sectional view showing a first alternative configuration of a circumferential wall section of the rear cover of the embodiment.

For example with the above embodiment, the brush holder 53 is formed with the curved face 54, with the lateral engagement portions 55 that extend circumferentially from that curved face 54 being adapted to engage with corresponding lateral engagement portions 63 located at circumferential end portions of the circumferential wall section 61, so that the brush holder 53 and the circumferential wall section 61, in combination, surround the circumferences of the slip rings 37, 38. However as shown in FIG. 5, it would be equally possible to form the rear cover 6 with a circumferential wall section 61A that is formed entirely as a tube, extending along the axial direction, which surrounds the entirety of the brush holder 53A of the brush unit 5A as well as the slip rings 37, 38. This has the advantage that the brush holder 53A can have a simple box-shaped configuration, as opposed to the more complex shape that is required with the brush holder 53 of the above embodiment due to incorporation of the curved face 54. The construction of the AC generator can thereby be simplified, while ensuring that foreign matter is excluded from the circumferential space around the slip rings.

Moreover, as also shown in FIG. 5, it would be equally possible to dispose the tubular portion 61A of the rear cover 6 in relation to the laterally protruding section 44 of the frame 4 such as to form a labyrinth aperture for entry of cooling air t0 the region around the slip rings.

Figure 6:
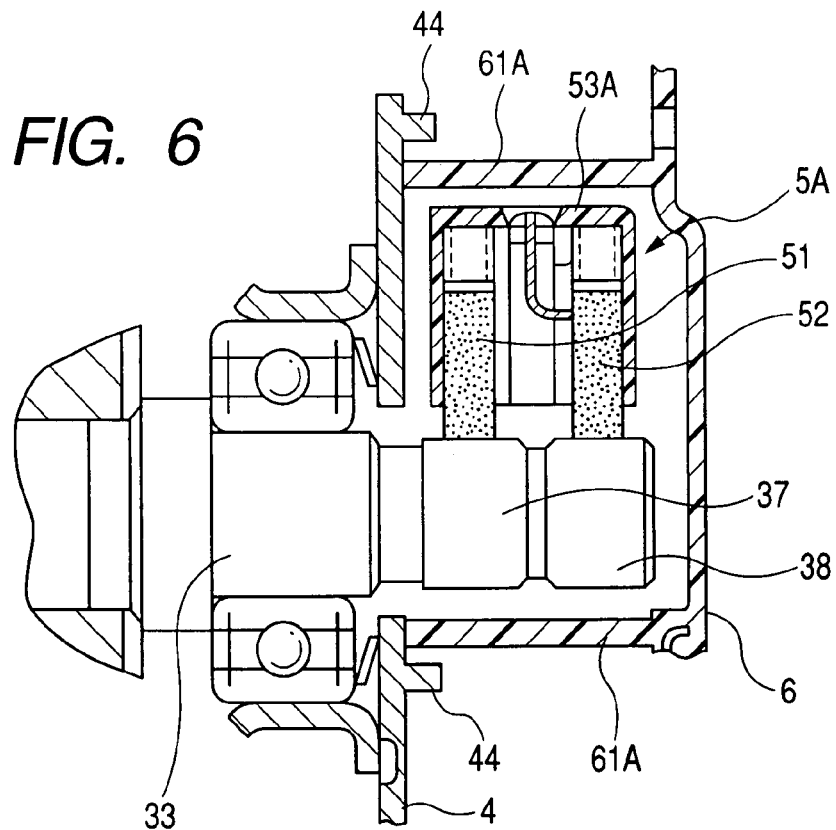
FIG. 6 is an expanded partial cross-sectional view showing a second alternative configuration of the circumferential wall section.

If it is not required to provide a flow of cooling air to the region around the slip rings, then as shown in FIG. 6, the tubular portion 61a can be disposed in relation to the frame 4 such that the outer end (tip) face of the tubular portion 61A contacts the outer end face of the frame 4, so that elastic deformation of the rear cover 6 occurs when the rear cover 6 is attached to the frame 4, i.e., with this occurring when the respective nuts of the bolts 43 are tightened down during assembly of the generator, thereby urging the rear cover 6 along the axial direction against the frame 4. This serves to seal the circumferential region around the slip rings against intrusion of foreign matter.

Figure 7:
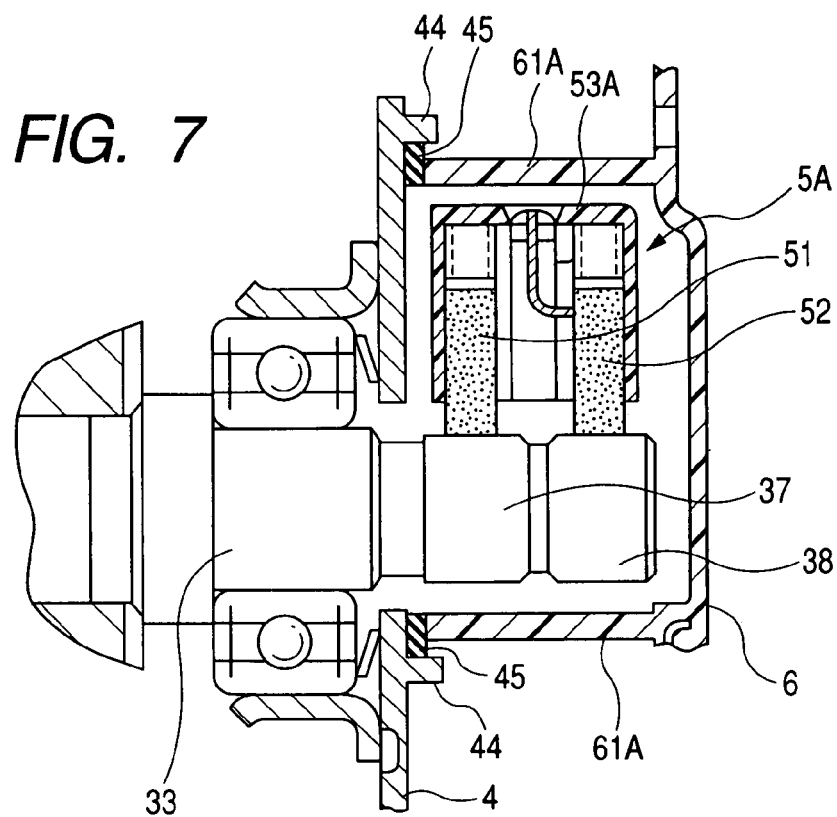
FIG. 7 is an expanded partial cross-sectional view showing a third alternative configuration of the circumferential wall section, used in conjunction with a sealing member.

Alternatively, as shown in FIG. 7, it is possible to provide a sealing member 45 formed of a flexible material such as rubber, disposed between the front (tip) face of the tubular portion 61A of the rear cover 6 and the rear outer end face of the frame 4, to thereby prevent intrusion of foreign matter into the circumferential region around the slip rings.

What is claimed is:

1. A vehicle-use AC generator comprising:
   a rotor having a rotor shaft, and a plurality of slip rings mounted on said rotor shaft coaxial with an axis of said rotor shaft;
   a stator disposed circumferentially surrounding said rotor;
   a frame which fixedly retains said stator and rotatably supports said rotor;
   a brush apparatus comprising a plurality of brushes and a brush holder, with said brush holder adapted to retain said brushes while maintaining said brushes in sliding contact with respectively corresponding ones of said slip rings; and
   a rear cover disposed to enclose a rear end portion of said generator,
   wherein said rear cover is integrally formed with a circumferential wall section disposed to enclose a part of a circumferentially extending region around said slip rings, and said brush holder is disposed to enclose a remaining part of said circumferentially extending region, and
   axially extending outer ends of said brush holder are formed with respective ones of a first pair of lateral engagement portions, and axially extending outer ends of said circumferential wall section of said rear cover are formed with respective ones of a second pair of lateral engagement portions, each lateral engagement portion of said first pair being configured to engage with a corresponding lateral engagement portion of said second pair along a direction parallel to said rotor shaft axis for fixedly attaching said brush holder and said circumferential wall section to one another to form a single unit.

2. A vehicle-use AC generator according to claim 1, wherein said rear cover is integrally formed with a laterally protruding section, extending parallel to said rotor shaft axis and comprising an outer circumferential face shaped to correspond with an inner circumferential face of said brush holder, said laterally protruding section being disposed to overlap said inner circumferential face of said brush holder and to be in direct contact with said inner circumferential face, thereby enabling displacement of said rear cover along a direction parallel to said rotor shaft axis within a specific range of displacement while maintaining said direct contact.

* * * * *